United States Patent [19]

Numazawa et al.

[11] 4,368,650
[45] Jan. 18, 1983

[54] COMPACT TRANSMISSION, INCLUDING A MAIN TRANSMISSION AND A SUBTRANSMISSION

[75] Inventors: Akio Numazawa, Nagoya; Hajime Arai, Aichi; Shoji Haga, Toyota, all of Japan

[73] Assignee: Toyota Jidosha Kogyo Kabushiki Kaisha, Aichi, Japan

[21] Appl. No.: 194,380

[22] Filed: Oct. 6, 1980

[30] Foreign Application Priority Data

Nov. 5, 1979 [JP] Japan .............................. 54-143751
Nov. 5, 1979 [JP] Japan .............................. 54-143753

[51] Int. Cl.$^3$ .......................... F16H 3/06; F16H 3/44; B60K 41/06
[52] U.S. Cl. ...................................... 74/740; 74/701; 74/752 C; 74/781 R; 74/867
[58] Field of Search ................ 74/740, 694, 700, 701, 74/781 R, 867, 868, 752 C, 752 A, 782; 192/85 CA, 110 B, 18 A

[56] References Cited

U.S. PATENT DOCUMENTS

| | | | |
|---|---|---|---|
| 2,097,021 | 10/1937 | De Normanville | 74/781 R |
| 2,314,554 | 3/1943 | Pennington | 74/871 |
| 3,241,399 | 3/1966 | Fisher et al. | 74/752 C X |
| 3,370,486 | 2/1968 | Lamburn | 74/781 R X |
| 3,424,034 | 1/1969 | Wickman | 74/781 R X |
| 3,714,836 | 2/1973 | Pierce et al. | 74/752 C |
| 3,978,742 | 9/1976 | Abbott | 74/781 R X |
| 4,287,791 | 9/1981 | Numazawa et al. | 74/701 |
| 4,314,488 | 2/1982 | Lauven | 74/752 C X |

FOREIGN PATENT DOCUMENTS

| | | | |
|---|---|---|---|
| 54-138948 | 10/1979 | Japan | 74/740 |
| 1439589 | 6/1976 | United Kingdom | 74/781 R |

Primary Examiner—Rodney H. Bonck
Attorney, Agent, or Firm—Birch, Stewart, Kolasch & Birch

[57] ABSTRACT

A transmission for an automotive vehicle, including a manually controlled main transmission and an automatically controlled subtransmission. The main transmission includes a main casing within which are rotatably supported a tubular intermediate shaft and a power output shaft, in parallel. Several gear wheels on each of these shafts cooperate, and by their selective engagement various different speed driving ratios may be obtained between the shafts. One end of the intermediate shaft and one end of the power output shaft project from one end of the main casing. A power input shaft passes coaxially through the tubular intermediate shaft and is rotatably supported therein. The ends of the power input shaft project from the ends of the tubular intermediate shaft. The subtransmission includes a subcasing attached to the aforesaid one end of the main casing, and within the subcasing a planetary gear mechanism is arranged between the power input shaft and the tubular intermediate shaft so as, under the control of a fluid pressure actuator, either to couple these two shafts together directly, or to provide an increase of rotational speed from the input shaft to the intermediate shaft. A fluid pressure control device selectively supplies actuating fluid pressure to the actuator, and is located within the subcasing in a position axially opposing the end of the power output shaft. The end of the power input shaft remote from the subcasing is driven. The fluid pressure control device is automatically controlled according to operational parameters of the vehicle to selectively supply fluid pressure to the actuator.

9 Claims, 7 Drawing Figures

COMPACT TRANSMISSION, INCLUDING A MAIN TRANSMISSION AND A SUBTRANSMISSION

BACKGROUND OF THE INVENTION

The present invention relates to a transmission device for an automotive vehicle, and more particularly relates to a transmission device, for an automotive vehicle, which incorporates a main transmission device which is manually operated and a subtransmission device which is automatically operated.

In a vehicle equipped with a transmission, it is desirable for the transmission to provide as many speed stages as practicable, in order to minimize noise emitted by the internal combustion engine of the vehicle, in order to maximize fuel efficiency of the vehicle, and in order to provide good road performance and drivability. However, the number of gear wheels required in a transmission increases as the number of speed stages available from the transmission increases, and accordingly the transmission becomes larger in its size and heavier in its weight. It is desirable, in view of requirements for fuel economy and performance, as well as for convenience of construction, for a transmission for a vehicle to be as a small and light as practicable. In particular, for a front engine front wheel drive vehicle, i.e. a so called FF vehicle, which is a vehicle configuration that is becoming more and more popular nowadays, strong demands are made on the transmission therefor, with regard to smallness and lightness, because of the limited space available for fitting the transmission, and because of the requirements of vehicle roadability and handling.

There is a known transmission for a vehicle, in which a greater number of transmission speed stages are made available, by the transmission being constructed as a combination of: a main transmission; and a subtransmission which is of a two stage shift type and which may be selected manually between a high speed stage and a low speed stage. It is known for such a subtransmission to be constructed employing a planetary gear mechanism, and in this case it is known, and usual, for the high speed stage to be a increased speed stage and for the low speed stage to be a directly connected speed stage. With a transmission constructed as explained above, with a main transmission which is manually shifted and a two stage planetary gear subtransmission which is manually shifted, thereby the number of speed stages available from the transmission as a whole is twice the number available from the main transmission, because the main transmission may be used in any of its speed stages, with either the subtransmission being set in its low speed stage, or in its high speed stage. For example, if the main transmission has four transmission speed stages, then as a whole eight speed stages are available from the combination of the main transmission and the subtransmission. Accordingly, it is possible to provide a transmission which has a large number of transmission stages, without this transmission being too large or heavy for fitting in a vehicle, especially a front engine front wheel drive vehicle.

However, a difficulty has arisen with regard to the actual operation of such a transmission which is a combination of a manually shifted main transmission and a manually shifted subtransmission. In order effectively to use all the speed stages which are available from such a transmission, it is necessary frequently to perform shifting of the main transmission, and also of the subtransmission, and to perform these shiftings in coordination. This is a very difficult thing for a driver of the vehicle to do, and may distract him from paying attention to road conditions, thus causing a serious accident. Further, in these circumstances, inevitably maximum performance of the vehicle, and good fuel economy thereof, are not attained. An inexperienced driver may find it quite impossible to coordinate the shifting of the main transmission and of the subtransmission, and certainly will not be able to operate the vehicle to the best advantage.

Further, with such a transmission combination of a manually controlled main transmission and a manually controlled subtransmission, in the prior art it has not been possible to reduce the size of the transmission as a whole, and the weight thereof, sufficiently to make the transmission very practicable for installing in a front engine front wheel drive vehicle. Especially, it is difficult to reduce the axial length of the transmission as a whole to a value which is acceptable. Further, in the prior art it has been necessary for the main transmission to be designed particularly with a regard to its being coupled to such a subtransmission, and accordingly this has caused expense, because very often it is the case that the provision of a subtransmission is an optional extra available to the purchaser of a vehicle, at an additional price, and in this case it is necessary for the vehicle factory to be equipped to manufacture two entirely different transmissions. This causes an unacceptably high production cost in many instances.

SUMMARY OF THE INVENTION

Therefore, it is an object of the present invention to provide a transmission for an automotive vehicle, which is a combination of a main transmission and a subtransmission, the main transmission being adapted to be manually shifted, and the subtransmission being adapted to be automatically shifted in accordance with the operational conditions of the internal combustion engine of the vehicle, and with the driving conditions of the vehicle, in such a way that the difficulty of operation of the vehicle by the driver thereof is reduced to an acceptable level.

It is a further object of the present invention to provide such a transmission which is a combination of a manually operated main transmission and an automatically operated subtransmission, in which the drivability and the road performance of the automotive vehicle incorporating the transmission is not substantially reduced over the case when the subtransmission is manually operated.

It is a further object of the present invention to provide such a transmission which is a combination of a manually operated main transmission and an automatically operated subtransmission, which is yet sufficiently small in size, particularly in axial length, and sufficiently light in weight to be satisfactorily used in a front engine front wheel drive vehicle.

It is a further object of the present invention to provide such a transmission which is a combination of a manually operated main transmission and an automatically operated subtransmission, in which a hydraulic fluid pressure control device for the subtransmission is contained conveniently within a subcasing containing the subtransmission, and accordingly does not occupy a great deal of space, nor substantially increases the axial length of the transmission as a whole, and according to which construction the number of points requiring fluid sealing between this hydraulic control device and the subtransmission is minimized.

It is a yet further object of the present invention to provide a transmission as described above which is a combination of a manually operated main transmission and an automatically operated subtransmission, in which the construction and the connection together of the main transmission and the subtransmission are so arranged that, by simply not fitting the subtransmission to the main transmission, and instead fitting thereto a simple coupling member, it is possible to utilize the main transmission by itself within a front engine front wheel drive vehicle, without use of a subtransmission, and without the main transmission itself requiring to be in any way modified.

According to the present invention, these and other objects are accomplished by a transmission for an automotive vehicle, comprising an engine, comprising: (a) a manually controlled main transmission, comprising: a main casing; a tubular intermediate shaft rotatably supported by said main casing; a power output shaft rotatably supported by said main casing parallel to said tubular intermediate shaft; a plurality of gear wheels on said tubular intermediate shaft; and a plurality of gear wheels on said power output shaft; selective engagement of said gear wheels on said tubular intermediate shaft and on said power output shaft providing a plurality of different speed gearing ratios between said tubular intermediate shaft and said power output shaft; one end of said tubular intermediate shaft and one end of said power output shaft protruding somewhat from one end of said main casing; (b) a power input shaft, coaxial with and passing through said tubular intermediate shaft and rotatably supported therein, one end of which protrudes from said one end of said tubular intermediate shaft, and the other end of which protrudes from the other end of the tubular intermediate shaft for being driven; (c) a subtransmission, comprising: a subcasing attached to said one end of said main casing; a sun gear rotatably supported by said one end of said power input shaft; a ring gear connected to said one end of said tubular intermediate shaft; a carrier connected to said one end of said power input shaft; a plurality of planetary pinions, each of which is meshed with said sun gear and with said ring gear and is rotatably supported by said carrier; an engagement member, coaxial with and connected to said sun gear so as to be rotationally fixed thereto, and axially displaceable with respect to said subcasing between a first position wherein it is frictionally engaged to said ring gear and a second position wherein it is frictionally engaged to said casing; and a fluid pressure actuator located in said subcasing for driving said engagement member between its said first and second positions; and (d) a fluid pressure control device for selectively supplying actuating fluid pressure to said fluid pressure actuator, located within said subcasing and axially opposing said one end of said power output shaft, and comprising a fluid pressure pump which is rotationally coupled with and driven by said one end of said power output shaft; said fluid pressure control device being automatically controlled so as selectively to supply actuating fluid pressure to said fluid pressure actuator, according to operational parameters of said automotive vehicle; (e) whereby the overall axial length, and the weight, of said transmission are minimized, while its operability by the driver of the vehicle is made no more difficult than that of a standard manual transmission, while providing sufficient number of gear ratios for dealing with various driving conditions, and also providing modular demountability for said subtransmission from said main transmission, while enabling fluid pressure connections between said fluid pressure control device and said subtransmission to be reliably provided.

According to such a construction, the automatic operation of the subtransmission between its directly connected speed stage and its speed increasing stage provides, from the transmission as a whole, twice the number of speed gearing ratios that are available from the main transmission by itself. The shifting of the subtransmission between the directly connected speed stage and the increased speed stage is performed automatically, according to the operational conditions of the internal combustion engine of the vehicle, and the driving conditions of the vehicle, and thus causes no additional burden on the driver, beyond what is due to the difficulty of shifting the main transmission manually by itself.

Further, because the power input shaft is driven from the side of the main transmission casing opposite to the side of it to which the subcasing of the subtransmission is attached, it is possible for the subtransmission to be removed from the main transmission, without disturbing the connection of the main transmission with the internal combustion engine of the vehicle. Thus, simply by connecting together the said one end of the tubular intermediate shaft, and the said one end of the power input shaft which protrudes therefrom, and which is coaxial therewith, it is possible to dispense with the subtransmission, and to use the main transmission by itself for a front engine front wheel drive automobile, without employing any subtransmission. Thus, it is possible for the provision of a subtransmission to a vehicle to be an optional extra available to a purchaser of the vehicle at an additional cost, without any requirement for provision for manufacturing two different kinds of main transmission, one for adaptation to the subtransmission, and the other for use on a stand alone basis.

Further, because the fluid pressure control device which selectively supplies actuating fluid pressure to the fluid pressure actuator is located as axially opposing said one end of said power output shaft, within said subcasing, it does not substantially increase the axial length of the transmission as a whole, because it is located at the side of the planetary gear mechanism of the subtransmission. Further, because the fluid pressure control device is located within the subcasing itself, connection of hydraulic fluid conduits from the fluid pressure control device to the fluid pressure actuator of the subtransmission may be made internally within the subcasing, and accordingly the number of points which require to be sealed against leakage of hydraulic fluid is reduced, over the case where the fluid pressure control device is located outside the subcasing, in a member attached thereto.

Accordingly, as a whole, a transmission of the sort described is particularly adapted for fitting to a front engine front wheel drive vehicle, especially one which is of a small size, and especially one which is required to be manufactured in a variety of configurations.

BRIEF DESCRIPTION OF THE DRAWINGS

The present invention will now be shown and described with reference to a preferred embodiment thereof, and with reference to the illustrative drawings.

It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
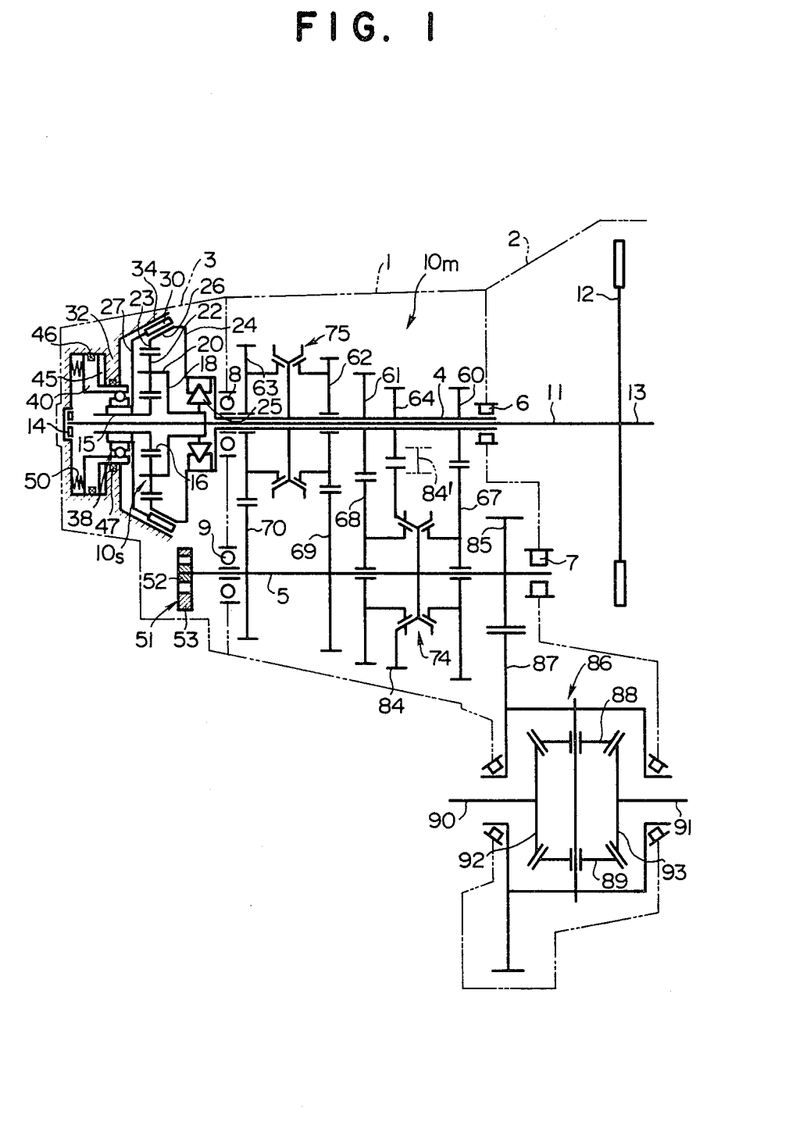
FIG. 1 is a schematic view showing the overall construction of a transmission which is a preferred embodiment of the transmission according to the present invention, and also showing a clutch and a differential gear device which are connected thereto.
Figure 2:
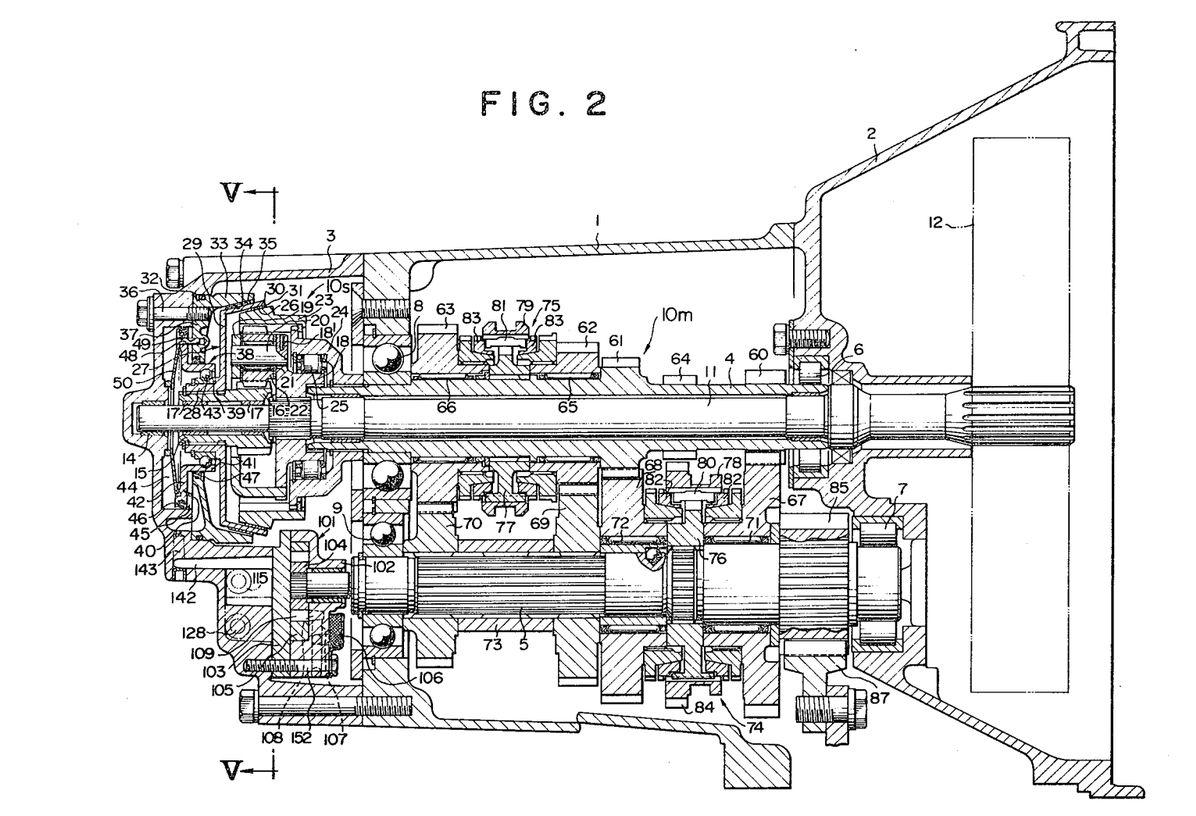
FIG. 2 is a longitudinal cross sectional view, showing the essential parts of a main transmission device and a subtransmission device included in the preferred embodiment of the transmission according to the present invention schematically shown in FIG. 1, also showing in outline form a clutch and sections through a line pressure regulation valve and a switching valve comprised in a hydraulic fluid pressure control system for the subtransmission, and also showing a section through a hydraulic fluid pump comprised in said hydraulic fluid pressure control system.

In the drawings, and most clearly in FIGS. 1 and 2, there is shown a preferred embodiment of the transmission according to the present invention. This transmission according to the present invention comprises a main transmission device 10m, a subtransmission 10s, and a power input shaft 11. The main transmission 10m is housed within a main casing 1, and the subtransmission 10s is housed within a subcasing 3. The subcasing 3 is attached to the left hand end in FIG. 2 of the main casing 1 by bolts or the like, and to the right hand end in FIG. 2 of the main casing 1 there is attached a clutch housing 2, again by bolts or the like.

The main transmission device 10m comprises a tubular intermediate shaft 4 and a power output shaft 5. The tubular intermediate shaft 4 is rotatably supported within the main casing 1 at its right hand end in FIG. 2 by a radial roller bearing 6, and at its left hand end by a ball bearing 8. The power output shaft 5 is rotatably supported, parallel to the tubular intermediate shaft 4 and below it in FIG. 2, within the main casing 1, at its right hand end in FIG. 2 by a radial roller bearing 7, and at its left hand end by a ball bearing 9. Within the main casing 1, between the tubular intermediate shaft 4 and the power output shaft 5, there are further provided a plurality of helical gears for transmitting rotational power between these shafts 4 and 5, according to selective engagement thereof, as will be described later.

The tubular intermediate shaft 4 projects a little to the left in the drawings out of the left hand side of the main casing 1. Further, one end of the power output shaft 5, again, projects a little to the left in the drawings out of the left hand side of the main casing 1.

Through the center of the intermediate shaft 4, and coaxial therewith, there passes the power input shaft 11. The power input shaft 11 is rotatable within the intermediate shaft 4 on plain bearings. The right hand end in the drawings of the power input shaft 11 is connected via a clutch 12 to the power output shaft 13 of an internal combustion engine 100 (shown schematically in FIGS. 3 and 4) which drives the automobile to which this transmission system is fitted, and the left hand end in the drawings of the power input shaft 11 projects out from the left hand end of the intermediate shaft 4 for a certain distance and is rotatably supported by a plain bearing 14 which is mounted in the end of the subcasing 3.

The subcasing 3 is attached to the left hand side in the drawings of the main casing 1, as described above, by fixing means. When these fixing means are disengaged, the subcasing 3 may be removed in the left hand direction in the drawings from the main casing 1, along with the subtransmission 10s and the oil pump 101 which will be described later, and will leave projecting from the main casing 1 only the end of the power output shaft 5, the end of the intermediate shaft 4, and projecting from this the end of the power input shaft 11, all three of which shafts have splines formed thereon, as will be explained later. Accordingly, in applications for the main transmission device 10m incorporating the main casing 1 in which it is not required to provide any subtransmission such as the subtransmission 10s shown in the drawings, it will be relatively easy to mount a simple connecting member between the splines on the intermediate shaft 4 and the splines on the power input shaft 11 which projects out therefrom, in order fixedly to couple these two shafts together so as to utilize the main transmission device 10m incorporating the main casing 1 by itself. This has a useful meaning with regard to flexibility of design and production of various models of automobile.

On the portion of the power input shaft 11 which protrudes out from the end of the intermediate shaft 4, and which is closer to the end of the intermediate shaft 4, there are formed some splines, and to the left of these splines in the drawing the power input shaft 11 is smooth. Upon this smooth end portion of the power input shaft 11 there is mounted, via plain bearings 17, a helically cut sun gear 16 which is formed with a hub extension 15 protruding leftwards from it in the drawings. Thus, the helical sun gear 16 is rotatably supported upon the power input shaft 11.

The helical sun gear 16 is axially slidable on the plain bearings 17 for a certain distance to the left and the right in the drawings on the input shaft 11.

On the aforesaid splined portion of the power input shaft 11 nearer to the end of the intermediate shaft 4, there is mounted a carrier 18 which has internal splines, so that the carrier 18 is rotationally fixed to the power input shaft 11. The carrier 18 is fitted with a pinion shaft 20, which is penetrated into a hole in the carrier 18 and is fixed therein by an engagement pin 18'. The pinion shaft 20 rotatably supports, via a needle bearing 21, a helically cut planetary pinion 22. In fact, of course, there are provided several pinion shafts such as 20, and several planetary pinions such as 22, but only one of each of them is shown in the drawing. On the end of the pinion shaft 20 remote from the carrier 18 there is mounted a cover 19. The planetary pinion 22 is meshed with the helical sun gear 16, and, when the carrier 18 rotates with respect to the helical sun gear 16, performs planetary motion around the helical sun gear 16 in a per se well known fashion.

To the aforesaid splines on the end of the intermediate shaft 4 there is engaged a connecting member 24, which is thereby rotationally coupled to the intermediate shaft 4. A helically cut ring gear 23 is mounted on the connecting member 24, and the inside teeth of this helical ring gear 23 are meshed with the helical planetary pinion 22. Accordingly, the helical ring gear 23 is rotationally coupled to the intermediate shaft 4. Between the carrier 18 of the helical planetary pinions 22 and this connecting member 24 there is mounted a one way clutch 25. This one way clutch 25 is so constructed as to connect the carrier 18 rotationally to the connecting member 24, i.e. to the helical ring gear 23, when the carrier 18 attempts to rotate at a higher speed in the normal direction of rotation provided by the engine 100 of the automobile, than the connecting member 24.

On the outer circumference of the helical ring gear 23 there is formed a conical clutch facing 26. A brake member 32, which is formed as a disk portion 37 and a ring portion 33 mounted to the outer circumference of the disk portion 37, is fixed by a bolt 36 (actually a plurality of bolts 36 are provided but only one is shown in the drawing) to the subcasing 3. The disk portion 37 has a central hole. The inner circumferential surface of the ring portion 33 is formed as a conical brake facing 34 opposing the conical clutch facing 26 formed on the helical ring gear 23 with a certain gap therebetween.

A frictional engagement member 27 is formed of three parts: a tubular hub portion 28, a disk portion 29 attached to the right hand end in the drawings of the hub portion 28 and extending outward therefrom, and a cone portion 30 extending in the right hand direction in the drawings from the outer circumference of the disk portion 29, and projecting between the conical clutch facing 26 and the conical brake facing 34. On the inner circumference of the cone portion 30 there is attached an annular clutch pad 31, and on the outer circumference of the cone portion 30 there is attached an annular brake pad 35. The hub portion 28 of the frictional engagement member 27 is supported on the hub extension 15 of the helical sun gear 16, and is rotationally connected thereto by splines.

In the shown structure, the frictional engagement member 27 is also axially fixed to the helical sun gear 16. Because the helical sun gear 16 is axially movable through a certain range along the smooth end portion of the power input shaft 11, as mentioned above, thereby the frictional engagement member 27 is axially displacable between a first position, to the right in the drawing, wherein the annular clutch pad 31 engages the conical clutch facing 28 formed on the helical ring gear 23, and accordingly the helical sun gear 16, the frictional engagement member 27, and the helical ring gear 23 are all rotationally coupled together, and a second position, to the left in the drawing, wherein the annular brake pad 35 engages with the conical brake facing 34 formed on the ring portion 33 of brake member 32, and accordingly the helical sun gear 16, the frictional engagement member 27, and the subcasing 3 are all rotationally coupled together, via the brake member 32.

The arrangements for displacing the frictional engagement member 27 between its aforesaid first and second positions will now be described. On the outer circumference of the hub portion 28 of the frictional engagement member 27 there is fitted an inner race 39. Running along this inner race 39 there are provided a plurality of balls 43. A piston member 40 is formed of a disk portion 42 with a hole through its center, and a hub portion 41 protruding in the right hand direction in the drawing from the inner circumference of the disk portion 42. An outer race, engaged with the balls 43, is directly cut on the inner surface of the hub portion 41. This outer race, the balls 43, and the inner race 39, together constitute a ball bearing 38, which engages the piston member 40 to the frictional engagement member 27 in such a fashion that these members are axially fixed with respect to one aother, but are rotationally free with respect to one another.

The disk portion 42 of the piston member 40 is fitted into a circular hole formed in the inner side of the left hand end in the drawing of the subcasing 3, and a fluid seal is positively ensured between these two members by a seal member 46 mounted in an outer circumferential groove formed on the disk portion 42 of the piston member 40. The outer circumference of the hub portion 41 of the piston member 40 is engaged with the inner circumference of the central hole formed in the disk portion 37 of the brake member 32, and further between these two members there is mounted a seal member 47, which is seated in a circumferential groove formed on the aforesaid inner circumferential surface of the central hole formed through the disk member 37, and which positively ensures a fluid seal thereof against the hub portion 41. Accordingly, an annular chamber 45 is defined around the hub portion 41 of the piston member 40, by the cooperation of the subcasing 3 and the piston member 40, on the right hand side in the drawing of the disk portion 42. This annular chamber 45 is sealed by the seal members 46 and 47, and constitutes an actuating fluid pressure chamber for driving the piston member 40.

In order to prevent rotational movement between the piston member 40 and the subcasing 3, without hindering axial movement of the piston member 40 within the subcasing 3, an indexing pin 48 is mounted in a hole in the disk portion 42 of the piston member 40, and its end protrudes across the pressure chamber 45 and its tip is projected into a hole 49 formed in the disk portion 37 of the brake member 32. Accordingly, as this pin 48 slides in and out of the hole 49, the piston member 40 can move axially to and fro within the subcasing 3, increasing and decreasing the size of the annular fluid pressure chamber 45, freely, but cannot rotate with respect to the subcasing 3.

On the left hand side in the drawing of the piston member 40, between the disk portion 42 and the subcasing 3, there is fitted a disk spring 50, which urges the piston member 40 and, connected thereto, the frictional engagement member 27 to the right in the drawing, i.e. urges the frictional engagement member 27 to its said first position wherein it is frictionally engaged to the helical ring gear 23 via the annular clutch pad 31. Further, hydraulic fluid pressure is supplied to the annular fluid pressure chamber 45, via passages 142 and 143 formed in the subcasing 3, under the control of a hydraulic fluid pressure control system, which is not shown in detail in FIG. 2, but which will be described later with reference to FIGS. 3–7, from a rotary hydraulic fluid pressure pump 101. This pump 101 comprises a casing 102 and a port plate 103, which are mounted to the subcasing 3 by a plurality of bolts 152, of which only one is shown in FIG. 2, an outer rotor 105 which is fixed with respect to the subcasing 3, and an inner rotor 104 which is, via splines, releasably drivingly engaged to the left hand end of the power output shaft 5 which projects out from the main casing 1, as described above. This hydraulic fluid pressure pump 101 will be described in more detail later.

The subtransmission 10s described above operates as follows. When no hydraulic fluid pressure is supplied to the annular fluid pressure chamber 45, then the piston member 40 is biased to the right in the drawings by the resilient force of the disk spring 50, and accordingly the frictional engagement member 27 is also biased to the right in the drawings, i.e., towards its first position wherein, via the clutch pad 31, its cone portion 30 is frictionally engaged to the conical clutch facing 26 formed on the helical ring gear 23. In this state, therefore, the helical sun gear 16 and the helical ring gear 23 are rotationally coupled to one another, and accordingly the planetary gear mechanism as a whole, including the carrier 18 and the connecting member 24, is in a locked state. Accordingly, the power input shaft 11, which is connected by splines to the carrier 18, is rotationally coupled to the intermediate shaft 4, which is connected by splines to the connecting member 24. Accordingly, input power transmitted by the rotation of the crankshaft 13 of the internal combustion engine 100 via the clutch 12 to the power input shaft 11 is directly transmitted to the intermediate shaft 4, without change of the rotational speed thereof. Thence, as will be explained later, via the main transmission device 10m, this rotational power is transmitted to the power output shaft 5. This state of the subtransmission 10s is the directly connecting stage, wherein no increase of rotational speed is provided thereby.

On the other hand, when a specified value of hydraulic fluid pressure is supplied to the annular fluid pressure chamber 45, then the pressure exerted on the right hand side of the disk portion 42 of the piston member 40 drives the piston member 40 to the left in the drawings, against the biasing action of the disk spring 50, and the frictional engagement member 27 is also moved to the left in the drawing, because it is coupled to the piston member 40 by the bearing 38, and cannot be moved with respect thereto in the axial direction. As a matter of fact, in this embodiment, because the frictional engagement member 27 is axially fixed to the tubular extension 15 of the helical sun gear 16, the helical sun gear 16 also moves a little to the left in the drawing at this time, by the sliding of the plain bearings 17 on the smooth end portion of the power input shaft 11, with respect to the subcasing 3, but this does not substantially affect the condition of meshing between the helical sun gear 16 and the helical planetary pinions 22. However, the movement of the frictional engagement member 27 to the left in the drawing disengages the conical clutch pad 31 frm the conical clutch facing 26 formed on the helical ring gear 23, and engages the conical brake pad 35 with the conical brake facing 34 of the brake member 32, thus stopping the rotation of the frictional engagement member 27, and, accordingly, stopping the rotation of the helical sun gear 16, because the helical sun gear 16 is rotationally fixed to the frictional engagement member 27 and thereby to the subcasing 3. Accordingly, in this state, the rotation of the power input shaft 11 provided by the action of the internal combustion engine 100 is transmitted, via the splined portion of the power input shaft 11, to the carrier 18 which carries the helical planetary pinions 22, and in a per se well known way is transmitted to the helical ring gear 23 at an increased rotational speed, i.e., at a reduction gearing ratio smaller than unity. That is to say, the helical ring gear 23 rotates faster than does the power input shaft 11, and accordingly the connecting member 24, which is connected to the helical ring gear 23, and the intermediate shaft 4, which is connected by splines to the connecting member 24, likewise rotate at a higher rotational speed than does the power input shaft 11. Thus, the shown embodiment of the subtransmission 10s provides its so called speed increasing stage.

Accordingly, by the selective supply of hydraulic fluid pressure to the annular fluid pressure chamber 45, and by the biasing action of the disk spring 50, the frictional engagement member 27 may be driven between its first and its second positions, and, according to this, the subtransmission 10s shown provides either the direct connection stage, or the speed increasing stage. This is accomplished, as explained above, with a very compact construction, which is economical of space, especially in the axial dimension of the subtransmission 10s.

By the shown construction in which the outer race of the ball bearing 38 is directly provided by the inner part of the hub portion 41 of the piston member 40, the radial dimension of the connecting structure between the piston member 40 and the frictional engagement member 27 may be much reduced, thereby lightening the construction. Further, because the number of parts in the construction is reduced, compared to the case in which a separate outer race is used, this construction is easier and cheaper to make, and more reliable in service.

In the shown construction, axial displacement of the frictional engagement member 27 has been possible, although in fact this frictional engagement member 27 is axially as well as rotationally coupled to the helical sun gear 16, by the fact that the helical sun gear 16 is axially displacable within the subcasing 3 to a certain extent, by sliding along the power input shaft 11 on the plain bearings 17. However, in a different construction, the helical sun gear 16 could be axially fixed within the subcasing 3, and the frictional engagement member 27 could be axially slidable with respect thereto, as on splines or the like.

Now, referring to FIGS. 3 and 4, the hydraulic fluid pressure control system mentioned above will be particularly described, and its controlling action for the subtransmission 10s will be explained. The two valves 113 and 126 comprised in the hydraulic fluid pressure control system may be seen in schematic transverse cross section in FIG. 2; however, their more detailed structures may be seen in FIGS. 3, 4, 6, and 7, which show them in longitudinal cross section.

The hydraulic fluid pressure pump 101 sucks up hydraulic fluid through its input port 108 from the lower part of the subcasing 3 through a filter 106 and through an hydraulic fluid passage 107, which is formed within the hydraulic fluid pump casing 102. In a per se well known fashion, this hydraulic fluid, which is pressurized in the pump chamber 109 defined between the inner rotor 104 and the fixed outer rotor 105 by the rotation of the inner rotor 104, is ejected through the output port 110 of the hydraulic fluid pressure pump 101 and through a hydraulic fluid passage 111 formed in the subcasing 3. A portion of this hydraulic fluid is diverted from the hydraulic fluid passage 111 through a hydraulic fluid passage 112 as lubricating hydraulic fluid to be supplied to the bearings of the power input shaft 11 and to various other bearings of the subtransmission 10s and of the main transmission 10m; but the major portion of this pressurized hydraulic fluid is supplied to a port 114 of a line pressure regulation valve 113.

The line pressure regulation valve 113 comprises a bore 115 formed in the subcasing 3 of the subtransmission 10s in the direction perpendicular to the plane of the drawing paper in FIG. 2, and further comprises a valve element 116 which reciprocates within this bore 115. The upper end in FIG. 3 of the bore 115 is closed by a plug 118, which is retained in place by a cover 117. Between the upper end in FIG. 3 of the valve element 116 and the plug 118, within the bore 115, there is therefore defined a first pressure chamber 119. At the lower end of the bore 115 the valve element 116 is narrowed to a smaller diameter and is protruded out from the end of the bore. Within this part of the bore 115, around the narrowed part of the valve element 116, there is fitted a compression coil spring 121, which biases the valve element 116 upwards in FIG. 3 so as to tend to diminish the size of the first pressure chamber 119. Thus, this compression cell spring 121 sits within a second pressure chamber 144, supply of fluid pressure to which biases the valve element 116 in the same direction as does the compression coil spring 121, and which has a smaller effective operational area (i.e., the area of the land defined between the larger and the smaller diameter portions of the valve element 116) for exerting fluid pressure on the valve element 116, than does the first pressure chamber 119.

The input port 114 opens to an annular chamber formed around a narrowed intermediate portion of the valve element 116, and an output port 123 also opens from this annular chamber. The fluid pressure present at the input port 114 is communicated to the first pressure chamber 119 from this annular chamber, via a radial hole formed in the valve element 116, and via an axial hole 120 also formed therein. Further, a vent port 122 opens from a position in the bore 115 which is lower in the drawing than is the input port 114. This vent port 122 is drained to the input port 108 of the hydraulic fluid pump 101 via a hydraulic fluid passage 124.

The operation of this line pressure regulation valve 113 is generally as follows. The output pressure produced by the hydraulic fluid pump 101 is communicated to the input port 114, and thence to the first pressure chamber 119, where it acts upon the valve element 116 via an effective working pressure area which is the entire cross sectional area of the bore 115. Thereby, the valve element 116 is pushed downwards in the drawing against the compression force of the compression coil spring 121, and against any pressure which may be present within the second pressure chamber 144. According to the balance of these forces, if the pressure present at the input port 114 is greater than a certain value, the valve element 116 will be displaced downwards within the bore 115 by more than a certain distance, and accordingly the input port 114 will be communicated with the vent port 122, and pressure in the aforesaid annular intermediate chamber will be vented through the hydraulic fluid passage 124 to the hydraulic fluid pump 101. Accordingly, therefore, no further rise of the pressure within the annular intermediate chamber will be possible. On the other hand, if this pressure should drop, even by a small amount, then the valve element 116 will move somewhat upwards in the drawing so as to interrupt the communication between the input port 114 and the vent port 122, and accordingly the pressure within this annular intermediate chamber will be able to rise again, because it is no longer vented. Accordingly, by this action, the pressure within this annular intermediate chamber, and accordingly the pressure at the output port 123 of the line pressure regulation valve 113, is regulated to a desirable value. The effect of varying the biasing pressure within the second pressure chamber 144, however, will be explained later.

This regulated line pressure appearing at the output port 123 of the line pressure regulation valve 113 is led, via a hydraulic fluid passage 125, to an input port 127 of a switching valve 126. This switching valve 126 is superficially similar in construction to the line pressure regulation valve 113, but in fact performs an entirely different function. The switching valve 126 comprises a valve element 129 which slides to and fro within a bore 128, and which is biased in the upwards direction in the drawing by a compression coil spring 139. Above the valve element 129 in FIG. 3, between its upper end and the lower end of a plug 130 which is retained as blocking the end of the cylinder bore 128 by the same over 117 which retains the plug 118, there is defined a third pressure chamber 131. However, this third pressure chamber 131 is not sealed as is the case with the first pressure chamber 119, but may be selectively vented via a pilot port 133 which will be explained hereinafer. Hydraulic fluid is supplied from the input port 127 to the third pressure chamber 131, via a small radial hole 141a which leads to an axial hole 141 formed in the valve element 129. It is essential for the operation of this construction of the switching valve that the radial hole 141a should be relatively small cross sectional area, so that it functions as a throttling element.

The lower end of the valve element 129 in the drawing is received within a chamber 99 which is not a pressure chamber. This chamber 99 is vented by a vent port at its bottom portion in the drawing. Further, at an axial position within the cylinder bore 128 somewhat below the input port 127, there is formed an output port 140. It is so arranged, in this construction, that when the valve element 129 is in its uppermost position within the bore 128, as shown in FIG. 3, then communication between the input port 127 and the output port 140 is interrupted, but the output port 140 is communicated, via the chamber 99, to the aforesaid vent port to be vented. On the other hand, as the valve element 129 moves downwards within the valve bore 128 from the position shown in FIG. 3 towards the position shown in FIG. 4, where it is at its extreme lowermost position within the bore 128, during this motion communication of the output port 140 to the chamber 99 is interrupted, somewhat before communication of the input port 127 to the output port 140 is established.

The venting of the third pressure chamber 131 through a passage 132 and the pilot port 133 is controlled by a solenoid 134. This solenoid 134 acts upon a plunger 135 whose tip portion 136 is formed as a valve element which cooperates with the pilot port 133, which is formed at the end of the passage 132. The solenoid assembly incorporating the solenoid 134 is housed within a cover 145 mounted on the cover 117.

Figure 3:
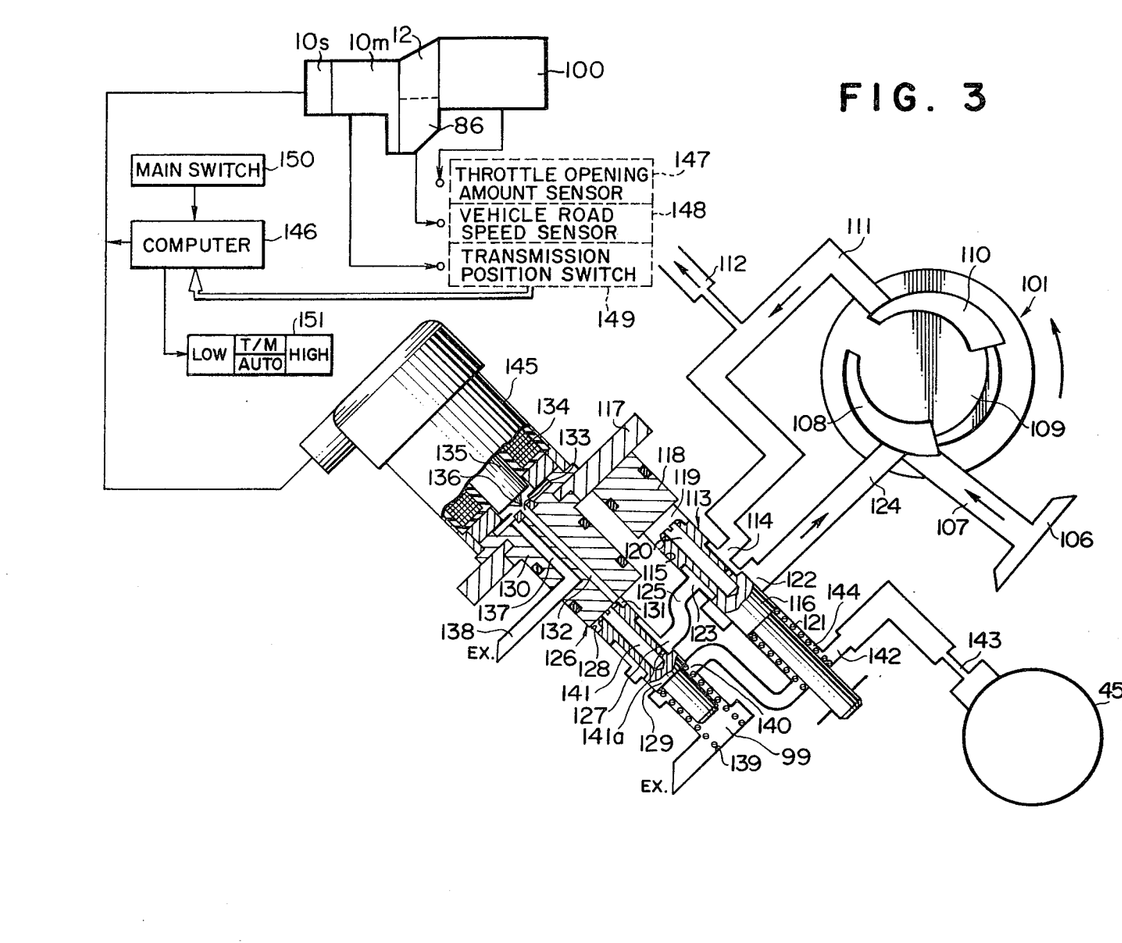
FIG. 3 is a part sectional part schematic view, showing in longitudinal section these two valves, schematically showing said hydraulic fluid pressure pump and a hydraulic fluid pressure actuator incorporated in the subtransmission shown in more detail in FIG. 2, and also showing schematically the engine of a vehicle to which this transmission according to the present invention is fitted, and the main transmission, the clutch, and the differential gear device, and showing the above mentioned valves in their states wherein no supply of operating pressure is being provided to said hydraulic fluid pressure actuator.

FIG. 3 shows the position of these structures, wherein the solenoid 134 is energized so that it attracts the plunger 135 upwards in FIG. 3, against the biasing action of a compression coil spring or the like, not shown in the drawing, and thereby removs the valve element 136 from the pilot port 133. In this condition, hydraulic fluid within the third pressure chamber 131 is vented through the passage 132 and through the open pilot port 133 so as to pass through a hydraulic fluid passage 137 and so as to be drained through a hydraulic fluid passage 138. In this condition, it should be appreciated that the actual line pressure present within the hydraulic fluid passage 125 and at the input port 127 of the switching valve 126 is not substantially lowered by this venting, because of the narrowness of the radial hole 141a formed in the valve element 129, which in this case functions as a throttling element and ensures that the pressure within the pressure chamber 131 can be effectively atmospheric pressure, without substantially affecting the pressure at the input port 127. The hydraulic fluid vented through the hydraulic fluid passage 138 is released to the interior of the subcasing 3.

The output port 140 of the switching valve 126 is communicated, via a hydraulic fluid passage, with a port provided in the second pressure chamber 144 of the line pressure regulation valve 113. From a port on the other side of this second pressure chamber 144, as viewed in FIG. 3 or 4, this passage is further communicated, via hydraulic fluid passages 142 and 143 formed in the subcasing 3, to the annular pressure chamber 45 of the subtransmission 10s.

Figure 4:
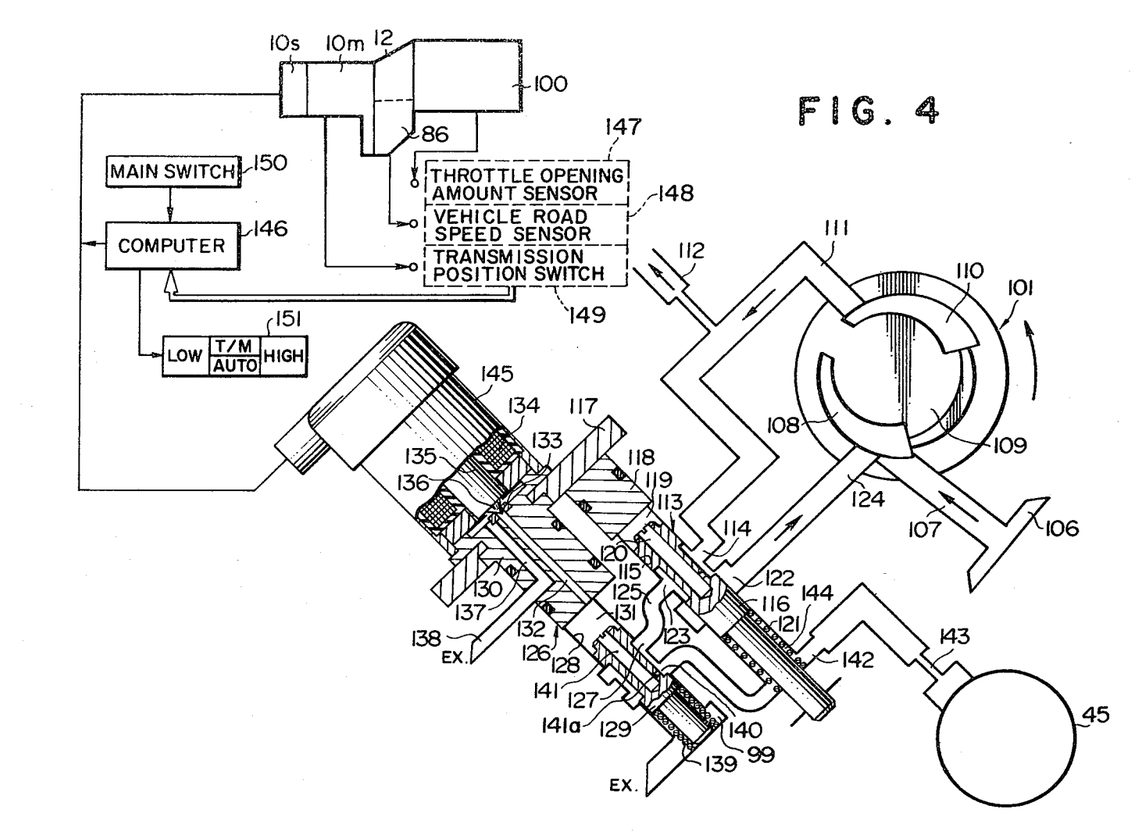
FIG. 4 is a view similar to FIG. 3, showing the same elements in their states when supply of hydraulic fluid pressure is being provided to said hydraulic fluid pressure actuator.

As shown in FIGS. 3 and 4, in the shown preferred embodiment of the transmission according to the present invention, a throttle opening amount sensor 147 is provided for the internal combustion engine 100, a vehicle road speed sensor 148 is provided as connected to the differential device 86, and a transmission position switch 149 is provided as connected to the main transmission device 10m. The output signals from these elements are conducted via a bus to a computer 146, which also receives power via a main switch 150. The computer 146 provides an output signal for energizing the solenoid 134. Further, the computer 146 also produces a display signal for controlling a display device 151 which shows the stage to which the subtransmission 10s is currently shifted, so that the driver of the vehicle may know whether the subtransmission 10s is in the high speed stage or the low speed stage.

In other embodiments of the present invention, the energization of the solenoid 134 could be performed in other ways, and according to other criteria than the ones practiced in the shown embodiment. Further discussion of the details of the control of the solenoid 134 by the computer 146, according to the signal provided by the sensors 147, 148, and 149 and the switch 150, etc., will not be made here, because this control may be varied, according to circumstances.

Figure 5:
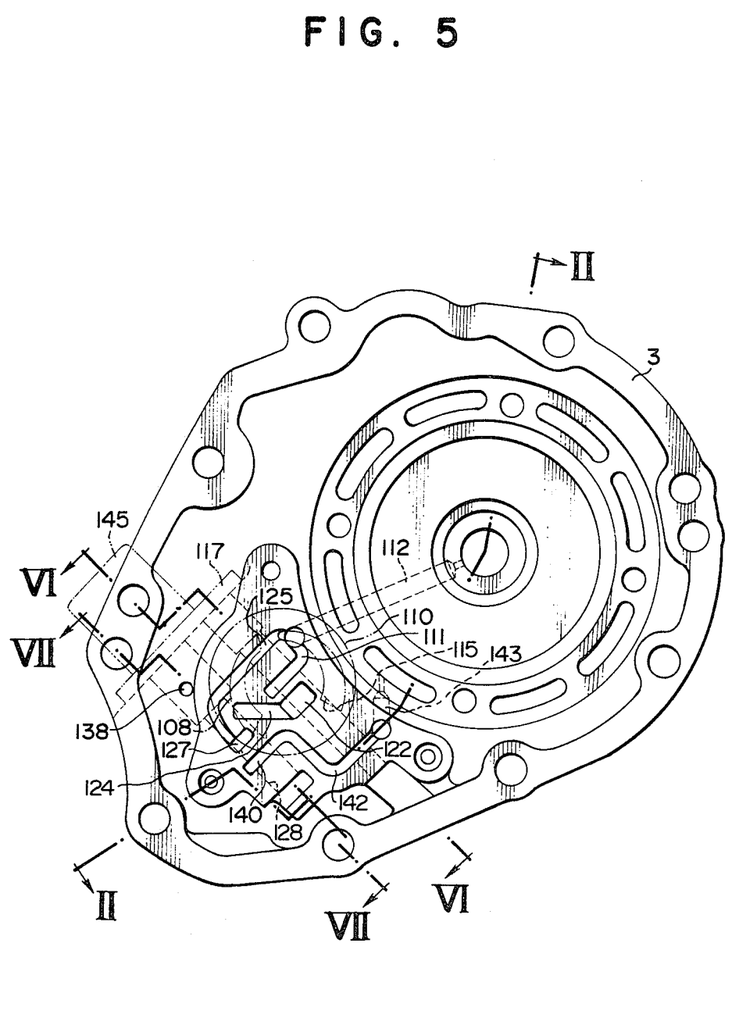
FIG. 5 is a sectional view through the subcasing of the subtransmission shown in FIG. 2, and taken along the line V—V in FIG. 2, the lines II—II in this figure showing the surface along which the sectional view shown in FIG. 2 is taken, which is not a plane.
Figure 6:
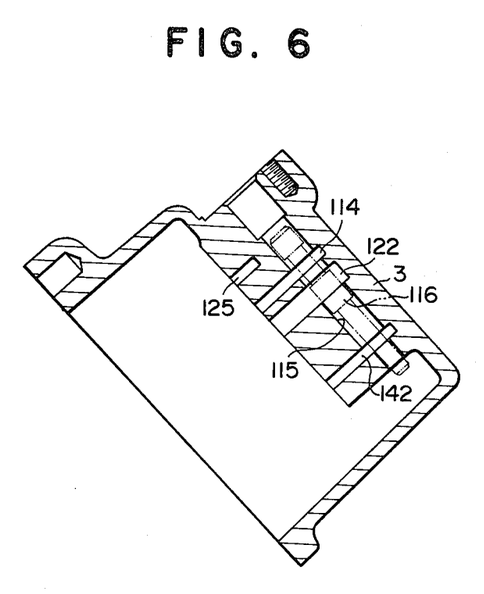
FIG. 6 is a sectional view through the aforesaid line pressure regulation valve incorporated in the hydraulic fluid pressure control system, and is taken along the line VI—VI in FIG. 5.
Figure 7:
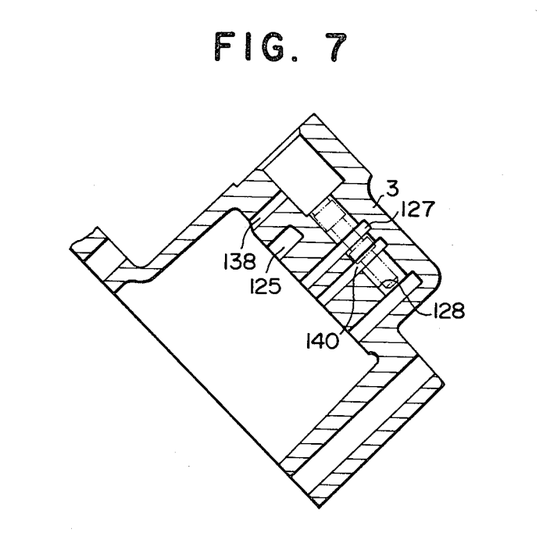
FIG. 7 is a sectional view through the aforesaid switching valve incorporated in the hydraulic fluid pressure control system, and is taken along the line VII—VII in FIG. 5.

In FIG. 5 there is shown a section through the subtransmission 10s, taken along the line V—V in FIG. 2. This shows the orientation of the line pressure regulation valve 113, and of the switching valve 126, more clearly. Also, the passages formed within the port plate 103 of the hydraulic fluid pressure pump 101 are clearly shown. Further, FIG. 6 shows a section through the line pressure regulation valve 113, taken along the line VI—VI in FIG. 5; and FIG. 7 is a section through the switching valve 126, taken along the line VII—VII in FIG. 5. The configurations of the hydraulic fluid conduits 125, 142, etc., and of the input and output ports of these valves, are clearly shown. From the above descriptions, it will be clear to one skilled in the hydraulic valve art how the switching valve 126 and the line pressure regulation valve 113 are constructed.

The hydraulic fluid pressure control system which has been described operates as follows. When the solenoid 134 is energized by the computer 146, as explained above, it attracts the plunger 135 and its valve element 136 away from the pilot port 133, and thereby the third pressure chamber 131 is vented, via the passage 132, the pilot port 133, the passage 137, and the passage 138, to be at substantially atmospheric pressure. Accordingly, under the biasing action of the compression coil spring 139, the valve member 129 of the switching valve 126 is impelled to its uppermost position within the bore 128, as shown in FIG. 3, by the compression coil spring 139. In this condition, connection of the input port 127 to the output port 140 is positively interrupted.

Further, according to a particular feature of this construction, at this time the output port 140 is vented via the chamber 99, and thereby the pressure within the annular pressure chamber 45 of the subtransmission 10s, the hydraulic fluid passages 143 and 142, the second pressure chamber 144 of the line pressure regulation valve 113, and the chamber 99 is substantially atmospheric. This ensures positively that the piston member 40 of the hydraulic fluid actuation explained above, incorporated in the subtransmission 10s, is positively allowed to return, under the biasing action of the disk spring 50, to its rightmost position in FIG. 2, so as to engage the sun gear 16 to the ring gear 23 by the engagement of the conical portion 30 of the friction engaging element 27 against the conical clutch facing 26 formed on the outside of the ring gear 23, via the annular clutch pad 31, so as to lock up the planetary gear mechanism and so as to ensure that the subtransmission 10s is in its directly connected condition, wherein it provides no speed increasing function between the power input shaft 11 and the intermediate shaft 4.

Also, because at this time the pressure within the second pressure chamber 144 of the line pressure regulation valve 13 is subtantially atmospheric, thereby the valve element 116 moves to and fro within the bore 115 under the opposing forces only of the compression coil spring 121, which impels it upwards in the drawing, and the pressure within the first pressure chamber 119, which impels it downwards in the drawing, acting on it via an effective area which is the full cross sectional area of the bore 15. Accordingly, the line output pressure within the output port 123, the hydraulic fluid passage 125, and the input port 127, etc., is maintained at a certain level which is a relatively low controlled level, as has been explained above. This state will be the case whenever the automobile is running faster than a certain very low speed, since the hydraulic fluid pressure pump 101 is activated by the turning of the power output shaft 5, which directly drives the differential device 86. In this state, because the regulated value of the line pressure is at this certain first relatively low value, the load upon the hydraulic fluid pressure pump 101 is relatively low, and accordingly this pump 101 does not consume a very great amount of the power generated by the internal combustion engine 100, and also does undue wearing of the working parts of the hydraulic fluid pump 101, or strain thereon, does not occur.

On the other hand, when the computer 146 does not energize the solenoid 134, then by the biasing action of the aforesaid compression coil spring not shown in the drawing, or the like, the plunger 135 and the valve member 136 on its tip are displaced downwards, as shown in FIG. 4, so that the valve member 136 closes the pilot port 133 and interrupts communication therethrough. In this state the draining of the third pressure chamber 131 of the switching valve 126 through the hydraulic fluid passage 132 and the pilot port 133, etc., is definitely interrupted. Accordingly, the pressure within this third pressure chamber 131 rises substantially to line pressure, and, because the compression coil spring 139 is arranged so as to have a biasing force which is quite unable to withstand the effect of this line pressure acting upon the end of the valve element 129, via an effective pressure area which is the full cross sectional area of the bore 128, thereby the valve element 129 is positively driven downwards in the bore 128, as shown in FIG. 4, to its extreme downmost position, wherein the communication of the output port 140 to the chamber 99 is interrupted, and instead the input port 127 is connected to the output port 140. Accordingly, in this condition, line pressure is conducted through the switching valve 128 and is supplied, via the second pressure chamber 144 of the line pressure regulation valve 113, and the passages 142 and 143, to the annular pressure chamber 45 of the subtransmission 10s. Thereby, as explained above, the piston member 40 is driven to the left in FIG. 2, and impels the friction engagement member 27 to its leftmost position in FIG. 2, so as to bring the brake pad 36 into contact with the conical brake facing 34 formed upon the ring portion 33 of the brake member 32, and so as thereby to couple the sun gear 16 to the brake member 32 and thereby to the subcasing 3, accordingly causing the planetary gear mechanism of the subtransmission 10s to function in its speed increasing condition, wherein it provides an increase of rotational speed between the power input shaft 11 and the intermediate shaft 4.

Further, according to a very important feature of this construction, the presence of the line pressure within the second pressure chamber 144 of the line pressure regulation valve 113 has a very definite function. The force due to this line pressure, which is of course substantially the same as the line pressure present within the first pressure chamber 119, counteracts a part of the force due to the line pressure present within this first pressure chamber 119, and ensures that the value of regulated line pressure provided by the line pressure regulation valve 113 is at a substantially higher level than was the case in the above described condition wherein no operating pressure was being supplied to the annular pressure chamber 45 of the subtransmission 10s. In more detail, in fact, because the effective operational area available for the pressure within the pressure chamber 144 is substantially smaller than that available for the substantially identical pressure within the first pressure chamber 119, the actual effective area available for operation of this pressure, as a whole, at the upper end of the valve element 116, is the difference between these two areas, i.e., in this construction, is the cross sectional area of the narrowed lower portion of the valve element 116. Accordingly, in order to counterbalance the pressure of the compression coil spring 121 to a sufficient amount to communicate the input port 114 with the vent port 122, a substantially higher line pressure is required to be present within the first pressure chamber 119, and this is the controlled value of line pressure provided in this condition.

Thereby, by this increasing of the line hydraulic fluid pressure when it is actually required for driving the piston member 40, etc., by supply thereof to the annular pressure chamber 45, a proper high line pressure is made available at this time for providing good operation of the subtransmission 10s; and this without causing an undue load upon the internal combustion engine 100 of the vehicle, on the other hand, when this line pressure is not required. Further, undue wear upon the moving parts of the hydraulic fliud pump 101, and strain thereon, is reduced by this concept of varying the line pressure according to the demands thereon. Further, by the construction explained above in which the valve member 129 of the switching valve 126 is displaced between its two positions within the bore 128, not directly by being moved by the solenoid 134, but under the influence of the pressure in the third pressure chamber 131 which is selectively drained by the opening and closing of the pilot port 133 by the valve element 136 controlled by the solenoid 134, since the amount of valve lift required to be provided by the solenoid 134 is much smaller than if the solenoid 34 were directly to control the motion of the valve member 129, accordingly the solenoid 134 may be smaller and lighter in construction than otherwise. According to such a construction, no heavy duty relay for controlling the solenoid 134 according to the electric signal from the computer 146 is required.

Now the construction and operation of the main transmission device 10m will be explained.

As mentioned before, the left hand end of FIG. 2 of the intermediate shaft 4 protrudes slightly out from the left hand side of the main casing 1, and is rotationally coupled to the connecting member 24, which is rotationally coupled to the ring gear 23; while the left hand end in FIG. 2 of the power output shaft 5 also somewhat protrudes out from the left hand side of the main casing 1 and projects into the oil pump 101 so that its splines engage with the inner rotor 104 of the oil pump 101. Further, through the central hole of the intermediate shaft 4 there passes the power input shaft 11; but this is not directly connected with the functioning of the main transmission device 10m.

There are arranged four pairs of helical gear wheels within the main casing 1, one of each pair being mounted on the intermediate shaft 4, while the other is mounted on the power output shaft 5; and the two gear wheels of each pair are kept meshed at all times. In more detail: on the intermediate shaft 4 there are mounted in order from the right to the left of FIG. 2: a first speed driving helical gear 60, which is rotationally coupled to the intermediate shaft 4; a second speed driving helical gear 61, which is rotationally coupled to the intermediate shaft 4; a third speed driving helical gear 62, which is rotatably supported on the intermediate shaft 4 via a needle bearing 65; and a fourth speed driving helical gear 63, which is rotatably supported on the intermediate shaft 4 via a needle bearing 66. Further, on the power output shaft 5 there are mounted: a first speed driven helical gear 67, which is rotatably mounted on the power output shaft 5 via a needle roller bearing 71; a second speed driven helical gear wheel 68, which is rotatably mounted on the power output shaft 5 via a needle roller bearing 72; a third speed driven helical gear wheel 69, which is rotationally coupled to the power output shaft 5; and a fourth speed driven helical gear wheel 70, which is also rotationally coupled to the power output shaft 5. The first speed driving and driven gear wheels 60 and 67, the second speed driving and driven gear wheels 61 and 68, the third speed driving and driven gear wheels 62 and 69, and the fourth speed driving and driven gear wheels 63 and 70, are, respectively, mutually meshed at all times.

Between the third speed driven gear 69 and the fourth speed driven gear 70, on the power output shaft 5, there is mounted a spacing collar 73. Further, between the first speed driving gear 60 an the second speed driving gear 61 there is mounted a reverse driving gear 64, rotationally coupled to the intermediate shaft 4, which will be explained hereinafter.

Between the first speed driven gear 67 and the second speed driven gear 68 there is provided a first/second speed synchronizer 74, and between the third speed driving gear 62 and the fourth speed driving gear 63 there is provided a third/fourth speed synchronizer 75. These synchronizers 74 and 75 are per se well known Borg-Warner type synchromesh mechanisms, and they respectively comprise clutch hubs 76 and 77, hub sleeves 78 and 79, shifting keys 80 and 81, synchronizer rings 82, 82 and 83, 83, etc.

The operation of the main transmission device 10m is as follows. The intermediate shaft 4 is rotated by the crankshaft 13 of the internal combustion engine 100 via the clutch 12 and the subtransmission 10s, as explained above.

When the hub sleeve 78 of the first/second speed synchronizer 74 is at its neutral position, and also the hub sleeve 79 of the third/fourth speed synchronizer 75 is at its neutral position, then rotational power is not transmitted from the intermediate shaft 4 to the power output shaft 5, and accordingly the main transmission 10m is in neutral condition.

When the hub sleeve 78 of the first/second speed synchronizer 74 is shifted to the right in FIG. 2 from its neutral position, and the hub sleeve 79 of the third/fourth speed synchronizer 75 is at its neutral position, then the clutch hub 76 is engaged to the first speed driven gear 67, and accordingly rotational power is transmitted from the intermediate shaft 4, via the first speed driving gear 60 and the first speed driven gear 67, to the power output shaft 5, and first gear stage is obtained.

When the hub sleeve 78 of the first/second speed synchronizer 74 is shifted to the left in FIG. 2 from its neutal position, and the hub sleeve 79 of the third/furth speed synchronizer 75 is at its neutral position, then the clutch hub 76 is engaged to the second speed driven gear 68, and accordingly rotational power is transmitted from the intermediate shaft 4, via the second speed driving gear 61 and the second speed driven gear 68, to the power output shaft 5, and second gear stage is obtained.

When the hub sleeve 78 of the first/second speed synchronizer 74 is in its neutal position, and the hub sleeve 79 of the third/fourth speed synchronizer 75 is shifted to the right in FIG. 2 from its neutral position, then the clutch hub 77 is engaged to the third speed driving gear wheel 62, and accordingly rotational power is transmitted from the intermediate shaft 4, via the third speed driving gear 62 and the third speed driven gear 69, to the power output shaft 5, and third gear stage is obtained.

Further, when the hub sleeve 78 of the first/second speed synchronizer 74 is in its neutral position, and the hub sleeve 79 of the third/fourth speed synchronizer 75 is shifted to the left in FIG. 2 from its neutarl position, then the clutch hub 77 is engaged to the fourth speed driving gear 63, and accordingly rotational power is transmitted from the intermediate shaft 4, via the fourth speed driving gear 63 and the fourth speed driven gear 70 to the power output shaft 5, and fourth gear stage is obtained.

According to the relative sizes shown in the figures of the gears 60, 61, 62, 63, etc., appropriate gear ratios are provided for the first, second, third, and fourth speed stages.

A reverse gear stage is provided as follows. On the hub sleeve 78 of the first/second speed synchronizer 74 there is formed a reverse driven gear 84, and a reverse intermediate gear 84', which may be seen in schematic form in FIG. 1 but which is not shown in FIG. 2, may be moved so as to engage with the reverse driven gear 84 and the reverse driving gear 64 mentioned above, in order to provide power transmission from the intermediate shaft 4 to the power output shaft 5 in a reversed manner.

The abovementioned displacements of the hub sleeves 78 and 79 of the first/second speed synchronizer 74 and the third/fourth speed synchronizer 75, and the movement of the reverse intermediate gear 84', are performed in a per se well known fashion by manual operation by the driver of the automobile to which the transmission is fitted, by use of a manual shift lever which actuates shift forks, and the like. These details are not shown in the drawings and further description thereof will be omitted.

On the right hand end of the power output shaft 5 there is mounted a power output gear 85, and this is meshed with a ring gear 87 of a differential gear device 86. The ring gear 87 is only shown partially in FIG. 2, and the different gear device 86 is only shown, in schematic form, in FIG. 1. This differential gear device 86 is of a per se well known sort, adapted for front engine front wheel drive automobiles, and comprises two bevel gears 88 and 89 which are rotatably mounted on a shaft which is parallel to the plane of the ring gear 87 and is mounted as passing perpendicularly through the rotational axis of the ring gear 87 on a frame, and two bevel gears 92 and 93, each of which meshes with both of the bevel gears 88 and 89, and which are respectively mounted on the ends of right and left axles 90 and 91 which are connected to the front wheels of the automobile.

By shifting the main transmission device 10m between its four forward speed stages and its one reverse speed stage, in cooperation with the shifting of the subtransmission device 10s between its direct engagement stage and its speed increasing stage, a totality of ten different transmission speed stages may be obtained from the combination of these transmission devices, between the power input shaft 11 and the power output shaft 5. However, as a practical matter, in general use the subtransmission device 10s is only shifted between its direct engagement stage and its speed increasing stage, according to the operating conditions of the internal combustion engine and the automobile, when the main transmission device 10m is shifted to its third speed stage or its fourth speed stage. Thus, in practice, the combination of the main transmission device 10m and the subtransmission 10s is used to provide six forward speed stages and one reverse speed stage for the automobile.

Thus, in summary, it is seen that the transmission according to the present invention is a combination of a main transmission which is manually shifted between a plurality of speed stages, and a subtransmission which is automatically shifted, according to the operational conditions of the internal combustion engine of the vehicle, and the driving conditions of the vehicle, between a directly connected speed stage and a speed increasing stage. Further, the subcasing of the transmission is attached to the end of the main casing of the main transmission remote from the internal combustion engine, and, within this subcasing, a planetary gear type auxiliary speed change mechanism incorporating a fluid pressure actuator is provided coaxially with the power input shaft and the intermediate shaft, while, beneath this planetary gear mechanism and beside it, within the subcasing, the fluid pressure control device which selectively provides actuating fluid pressure to the fluid pressure actuator of the transmission is located as axially opposing the power output shaft. Thereby, the transmission as a whole is made very compact. Further, since the fluid pressure control device is mounted within the subcasing, accordingly, as compared to the case wherein it is located outside the subcasing in a body member attached thereto, the number of points requiring sealing against fluid leakage is considerably reduced. Thereby, the danger of oil leaks from the transmission as a whole is reduced, and also it is effectively precluded that the fluid pressure control device should be damaged from the outside by flying stones knocked up when the vehicle proceeds along a rough road, or by the actions of an inexperienced mechanic, etc.

Further, an advantage of the present construction is that the subtransmission is mounted between the clutch and the main transmission, in the vehicle power train. Accordingly, the rotational speed of the rotating power passing through the subtransmission is relatively high, while its torque is relatively low, as compared to the case in which the subtransmission is mounted after the main transmission in the power train. Accordingly, the mechanical strength required for the various components of the subtransmission is reduced. Thus, the subtransmission may be made smaller and lighter in weight than in the above described prior art case when it is provided after the main transmission in the power train.

Further, as noted above, because the internal combustion engine which drives the power input shaft is located on the side of the main transmission casing opposite to the side thereof to which the subcasing of the subtransmission is fixed, if it is required to use the main transmission by itself in a vehicle without the use of any subtransmission, it is possible for the subtransmission not to be fitted to the main transmission, and instead it is only necessary to provide a simple connecting member which connects together said one end of the tubular intermediate shaft with said one end of the power input shaft, which protrudes therefrom and which is coaxial therewith. This means that exactly the same main transmission can be used both in a vehicle which is to be equipped with a subtransmission, and in one which does not require to be fitted with a subtransmission. This desirably increases the possibility of using common subassemblies for different vehicle models during production.

It is therefore seen the transmission according to the present invention is particularly suited for use in a front engine front wheel drive vehicle, and especially for one in which the size and weight constraints for such a subtransmission are severe.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

We claim:

1. A transmission for an automotive vehicle comprising an engine, comprising:

(a) a manually controlled main transmission, comprising: a main casing; a tubular intermediate shaft rotatably supported by said main casing; a power output shaft rotatably supported by said main casing parallel to said tubular intermediate shaft; a plurality of gear wheels on said tubular intermediate shaft; and a plurality of gear wheels on said power output shaft; selective engagement of said gear wheels on said tubular intermediate shaft and on said power output shaft providing a plurality of different speed gearing ratios between said tubular intermediate shaft and said power output shaft; one end of said tubular intermediate shaft and one end of said power output shaft protruding somewhat from one end of said main casing;

(b) a power input shaft, coaxial with and passing through said tubular intermediate shaft and rotatably supported therein, one end of which protrudes from said one end of said tubular intermediate shaft, and the other end of which protrudes from the other end of the tubular intermediate shaft for being driven;

(c) a subtransmission, comprising: a subcasing attached to said one end of said main casing; a sun gear rotatably supported by said one end of said power input shaft; a ring gear connected to said one end of said tubular intermediate shaft; a carrier connected to said one end of said power input shaft; a plurality of planetary pinions, each of which is meshed with said sun gear and with said ring gear and is rotatably supported by said carrier; an engagement member, coaxial with and connected to said sun gear so as to be rotationally fixed thereto, and axially displaceable with respect to said subcasing between a first position wherein it is frictionally engaged to said ring gear and a second position wherein it is frictionally engaged to said casing; and a fluid pressure actuator located in said subcasing for driving said engagement member between its said first and second positions; and (d) a fluid pressure control device for selectively supplying actuating fluid pressure to said fluid pressure actuator, located within said subcasing and axially opposing said one end of said power output shaft, and comprising a fluid pressure pump which is rotationally coupled with and driven by said one end of said power output shaft; said fluid pressure control device being automatically controlled so as selectively to supply actuating fluid pressure to said fluid pressure actuator, according to operational parameters of said automotive vehicle;

(e) whereby the overall axial length, and the weight, of said transmission are minimized, while its operability by the drive of the vehicle is made no more difficult than that of a standard manual transmission, while providing sufficient number of gear ratios for dealing with various driving conditions, and also providing modular demountability for said subtransmission from said main transmission, while enabling fluid pressure connections between said fluid pressure control device and said subtransmission to be reliably provided.

2. A transmissiom according to claim 1, wherein said one ends of said power input shaft, said power output shaft, and said tubular intermediate shaft are each formed with a plurality of splines, wherein said fluid pressure pump comprises a rotary power input member formed with a plurality of splines, and wherein said carrier and said ring gear are each formed with a plurality of splines; said splines on said one end of said power input shaft being engaged in a power transmitting manner to said splines on said carrier, said splines on said one end of said tubular intermediate shaft being engaged in a power transmitting manner to said splines on said ring gear, and said splines on said power output shaft being drivingly engaged in a power transmitting manner to said splines on said rotary power input member of said fluid pressure pump; whereby, if the subcasing is detached from the main casing, the subcasing and the elements therein may be directly removed from the main transmission by disengaging said splines on said one end of said power input shaft from said splines on said carrier, said splines on said one end of said tubular intermediate shaft from said splines on said ring gear, and said splines on said one end of said power output shaft from said splines on said rotary power input member of said fluid pressure pump, and whereby then, by rotationally coupling together said one ends of said power input shaft and said tubular intermediate shaft, said main transmission may be used, without said subtransmission, as a manual transmission.

3. A transmission according to claim 1 or 2, wherein the size in the axial direction of said fluid pressure control device is less than the size in the axial direction of said subtransmission, and in which, in the axial dimension, said fluid pressure control device occupies a space within the space occupied by said subtransmission; whereby the size in the axial direction of said transmission as a whole is not substantially increased by said fluid pressure control device, but is substantially equal to the sum of the sizes in the axial direction of said main transmission and of said subtransmission.

4. A transmission according to claim 1, wherein fluid connections between said fluid pressure control device and said subtransmission are made within said subcasing, and do not extend to the outside of said subcasing, whereby fluid tightness of said transmission as a whole is promoted.

5. A transmission according to claim 1, wherein said fluid pressure actuator comprises: a piston member coaxial with said engagement member and comprising an annular disk and a hub projecting from the center of said disk on its one side, said hub being connected to said engagement member so as to be axially fixed thereto and so as to be rotationally free with respect thereto, an annular fluid pressure chamber being defined around and coaxial with said hub by the cooperation of said subcasing and said piston member on said one side of said disk, selective supply of fluid pressure to said fluid pressure chamber driving said engagement member between its said positions; and a means for biasing said piston member in the direction to reduce the volume of said annular fluid pressure chamber.

6. A transmission according to claim 5, wherein said biasing means urges said engagement member toward its first position, and supply of fluid pressure to said annular fluid pressure chamber urges said engagement member towards its second position.

7. A transmission according to claim 5, further comprising a means for engaging said piston member to said subcasing so that said piston member is rotationally fixed to said subcasing, but is axially free with respect to said subcasing.

8. A transmission according to any one of claims 5–7, wherein said engagement member is axially fixed to said sun gear, and said sun gear is axially displacable with respect to said subcasing.

9. A transmission according to claim 1, wherein said hydraulic fluid pressure control system further comprises: a line pressure regulation valve, which receives a supply of hydraulic fluid pressure from said fluid pressure pump, and which produces a regulated line hydraulic fluid pressure; and a switching valve, comprising a pilot port, which receives a supply of said line hydraulic fluid pressure, and which selectively supplies said line hydraulic fluid pressure as an operating pressure to said hydraulic actuator according to the opening and closing of said pilot port; said operating pressure, when thus provided by said switching valve, being also supplied to said line pressure regulation valve and increasing the regulated valve of said line hydraulic fluid pressure; whereby, when operating hydraulic fluid pressure is not being provided to said hydraulic actuator, the value of said line hydraulic fluid pressure is maintained at a predetermined lower level; but, when operating hydraulic fluid pressure is being provided to said hydraulic actuator, the value of said line hydraulic fluid pressure is maintained at a predetermined higher level; whereby load on said hydraulic fluid pump, when said operating pressure is not required to be provided to said hydraulic actuator, is low.

* * * * *